(12) United States Patent
Standridge

(10) Patent No.: US 6,577,766 B1
(45) Date of Patent: Jun. 10, 2003

(54) METHOD AND APPARATUS FOR MOTION DETECTION IN THE DISCRETE COSINE TRANSFORM DOMAIN

(75) Inventor: Aaron D. Standridge, Overland Park, KS (US)

(73) Assignee: Logitech, Inc., Fremont, CA (US)

( * ) Notice: Subject to any disclaimer, the term of this patent is extended or adjusted under 35 U.S.C. 154(b) by 0 days.

(21) Appl. No.: 09/437,931

(22) Filed: Nov. 10, 1999

(51) Int. Cl.[7] .................................................. G06K 9/36
(52) U.S. Cl. ...................................................... 382/236
(58) Field of Search ................................. 382/232, 236, 382/238, 240, 242, 248, 250; 348/384.1, 394.1, 395.1, 400.1–404.1, 407.1–416.1, 420.1, 421.1, 425.2, 430.1, 431.1; 375/240.23, 240.24

(56) References Cited

U.S. PATENT DOCUMENTS

| | | | | |
|---|---|---|---|---|
| 4,754,492 A | * | 6/1988 | Malvar ........................ | 382/232 |
| 5,117,287 A | * | 5/1992 | Kolke et al. ................. | 358/404 |
| 5,422,676 A | * | 6/1995 | Herdez et al. ............... | 348/420 |
| 5,731,832 A | | 3/1998 | Ng .............................. | 348/155 |
| 5,786,856 A | * | 7/1998 | Hall et al. ................... | 348/403 |

* cited by examiner

*Primary Examiner*—Jose L. Couso
(74) *Attorney, Agent, or Firm*—Townsend and Townsend and Crew LLP

(57) ABSTRACT

A method and apparatus for detecting motion in digitized images involves the use of discrete cosine transforms. Video images are reduced in size to reduce the number of DCT blocks used in the analysis. Similarly, quantization of only portions of the DCT blocks are needed to detect motion between successive video images.

27 Claims, 4 Drawing Sheets

METHOD AND APPARATUS FOR MOTION DETECTION IN THE DISCRETE COSINE TRANSFORM DOMAIN

BACKGROUND OF THE INVENTION

The present invention relates generally to digital signal processing and more particularly to processing for the detection of motion in digitized video image data.

Increased computer processing is required to provide for modern digital services. As an example, the Internet has spawned a plethora of multimedia applications for presenting images and playing video and audio content. These applications involve the manipulation of complex data in the form of still graphic images and full motion video. It is commonly accepted that digitized images consume prodigious amounts of storage. For example, a single relatively modest-sized image having 480×640 pixels and a full-color resolution of 24 bits per pixel (three 8-bit bytes per pixel), occupies nearly a megabyte of data. At a resolution of 1024×768 pixels, a 24-bit color image requires 2.3 MB of memory to represent. A 24-bit color picture of an 8.5 inch by 11 inch page, at 300 dots per inch, requires as much as 2 MB of storage. Video images are even more data-intensive, since it is generally accepted that for high-quality consumer applications, images must occur at a rate of at least 30 frames per second. Current proposals for high-definition television (HDTV) call for as many as 1920×1035 or more pixels per frame, which translates to a data transmission rate of about 1.5 billion bits per second. Other advances in digital imaging and multimedia applications such as video teleconferencing and home entertainment systems have created an even greater demand for higher bandwidth and consequently ever greater processing capability.

Traditional lossless techniques for compressing digital image and video information include methods such as Huffman encoding, run length encoding and the Lempel-Ziv-Welch algorithm. These approaches, though advantageous in preserving image quality, are otherwise inadequate to meet the demands of high throughput systems. For this reason, compression techniques which typically involve some loss of information have been devised.

The Karhunen-Loeve (KL) transform is usually identified as the optimal transform for decorrelating the data in the transform domain and packing a maximum energy in a given number of samples. However, there are two generally recognized problems with the KL transform. One, the KL transform is unique for only one class of signals, and two, a fast KL transform algorithm is not known. Accordingly, alternative mathematical transforms have been investigated. The discrete cosine transform is generally used for transform domain coding of video images because a fast discrete cosine transform algorithm exists and the cosine transform has been shown to be virtually identical to the KL transform for numerous practical conditions.

In the traditional discrete cosine transform compression methods, the video frame is divided into a series of non-overlapping blocks. Typically, a block is sixteen pixels wide and sixteen pixels high. The discrete cosine transform of a two dimensional block is implemented by transforming the digital data for the pixels in a first direction and then transforming in the second direction. The resulting cosine transform coefficients include a single term which represents the average signal energy in the block, sometimes referred to as the DC term, and a series of terms, sometimes referred to as the AC terms, which represent the variation of the signal energy about the DC component for the block.

A quantizer is used to reduce the range of the cosine transform coefficients. A quantizer is a mapping from the continuous variable domain of transform coefficients into the domain of integers. Commonly used is the uniform quantizer, which may be specified by a number. The number is divided into each transform coefficient with the resulting quotient rounded to the nearest integer. The quantized cosine transform coefficients are then encoded for transmission over a data channel.

The Joint Photographic Experts Group (JPEG) has created a standard for still image compression, known as the JPEG standard. This standard defines an algorithm based on the DCT. An encoder using the JPEG algorithm processes an image in four steps: linear transformation, quantization, run-length encoding (RLE), and Huffman coding. The decoder reverses these steps to reconstruct the image. For the linear transformation step, the image is divided up into blocks of 8×8 pixels and a DCT operation is applied in both spatial dimensions for each block. The purpose of dividing the image into blocks is to overcome a deficiency of the DCT algorithm, which is that the DCT is highly non-local. The image is divided into blocks in order to overcome this non-locality by confining it to small regions and doing separate transforms for each block. However, this compromise has the disadvantage of producing a tiled appearance which manifests itself visually by having a blockiness quality.

The quantization step is essential to reduce the amount of information to be transmitted, though it does cause loss of image information. Each transform component is quantized using a value selected from its position in each 8×8 block. This step has the convenient side effect of reducing the abundant small values to zero or other small numbers, which can require much less information to specify.

The run-length encoding step codes runs of same values, such as zeros, to produce codes which identify the number of times to repeat a value and the value to repeat. A single code like "8 zeros" requires less space to represent than a string of eight zeros, for example. This step is justified by the abundance of zeros that usually results from the quantization step.

Huffman coding (a popular form of entropy coding) translates each symbol from the run-length encoding step into a variable-length bit string that is chosen depending on how frequently the symbol occurs. That is, frequent symbols are coded with shorter codes than infrequent symbols. The coding can be done either from a preset table or one composed specifically for the image to minimize the total number of bits needed.

Similarly to JPEG, the Motion Pictures Experts Group (MPEG) has promulgated two standards for coding image sequences. The standards are known as MPEG I and MPEG II. The MPEG algorithms exploit the common occurrence of relatively small variations from frame to frame. In the MPEG standards, a full image is compressed and transmitted only once for every 12 frames. These "reference" frames (so-called "I-frames" for intra-frames) are typically compressed using JPEG compression. For the intermediate frames, a predicted frame (P-frame) is calculated and only the difference between the actual frame and each predicted frame is compressed and transmitted.

Any of several algorithms can be used to calculate a predicted frame. The algorithm is chosen on a block-by-block basis depending on which predictor algorithm works best for the particular block. One technique called "motion estimation" is used to reduce temporal redundancy. Temporal redundancy is observed in a movie where large portions of an image remain unchanged from frame to adjacent frame. In many situations, such as a camera pan, every pixel in an image will change from frame to frame, but nearly every pixel can be found in a previous image. The process of "finding" copies of pixels in previous (and future) frames is called motion estimation. Video compression standards such as H.261 and MPEG 1 & 2 allow the image encoder (image compression engine) to remove redundancy by specifying the motion of 16×16 pixel blocks within an image. The image being compressed is broken into blocks of 16×16 pixels. For each block in an image, a search is carried out to find matching blocks in other images that are in the sequence being compressed. Two measures are typically used to determine the match. One is the sum of absolute difference (SAD) which is mathematically written as $$\sum_i \sum_j (|a_i - b_j|),$$

and the other is the sum of differences squared (SDS) which is mathematically written as $$\sum_i \sum_j (a_i - b_j)^2.$$

The SAD measure is easy to implement in hardware. However, though the SDS operation requires greater precision to generate, the result is generally accepted to be of superior quality.

For real time, high-quality video image decompression, the decompression algorithm must be simple enough to be able to produce 30 frames of decompressed images per second. The speed requirement for compression is often not as extreme as for decompression, since in many situations, images are compressed offline. Even then, however, compression time must be reasonable to be commercially viable. In addition, many applications require real time compression as well as decompression, such as real time transmission of live events; e.g., video teleconferencing.

Applications exist in which pictures need to be taken only on occasion. For example, a security system may have various cameras deployed about a site. Receiving a constant stream of images from each camera is not practical, as the capacity of the storage will be limited, whether in the form of analog video tape or digitized images stored on disk drives. Rather, it would be preferable to acquire images only when there motion is detected in the image. These situations tend not to be frequent and the duration where there is motion tends to be short. Motion detection could be used to trigger the act of acquiring images.

Another use is on the Internet, where people host web pages which use a camera to provide a view to their living room, for example, for the world to see. Typically, it is desired to update the web site with an image only when the scene has changed. Motion detection capability would be useful here.

The foregoing JPEG and MPEG techniques are ideal for the image acquisition half of these applications. However, they are not well suited for detecting motion elements in an image. Motion detection involves an analysis of the image content. The JPEG definition is concerned only with compression of an image, not the content of an image. Though MPEG processing involves the use of a motion estimator operation to find displaced pixels to calculate P frames, the technique is computationally intensive. More importantly, the technique does not provide a true indication of motion. For example, pixel displacement among successive frames can arise as a result of changing light patterns due to a light source being turned off, or turned on.

What is needed is a scheme for detection motion in a series of digitized images. It is desirable to provide a scheme which can quickly detect motion in a video scene. There is a need for a system which can provide image acquisition capability where the image acquisition is triggered by the detection of motion.

SUMMARY OF THE INVENTION

A method for detecting motion in digitized images according to the invention includes providing first and second arrays of pixels, representing previous and current video images respectively. A set of previous discrete cosine transform (DCT) blocks are produced, based on a portion of the first array of pixels. Likewise, a set of current DCT blocks are produced based on a portion of said second array of pixels. Each of the current DCT blocks is compared to its corresponding previous DCT block to make a determination whether it should be marked as MODIFIED or not. The comparison is based on portions of the DCT blocks. The algorithm reduces the computational burden of motion detection involving DCT blocks.

A motion detection system comporting with the invention includes a computing device and a source of digital image data coupled to the computing device. The image data corresponds to images of a scene in which the motion is to be detected. The computer includes a computer program which comprises program code to produce an array of luminance data based on a portion of the pixel array comprising an image. The program further includes code to produce a set of discrete cosine transform (DCT) data blocks based on the luminance data. First and second DCT blocks are thereby produced for previous and current images respectively. There is program code to compare corresponding data between two of the DCT blocks, wherein only some of said data between the two DCT blocks is compared and a counter is incremented when the comparison satisfies a first criterion. This code executed for pairs of previous and current DCT data blocks. There is program code to indicate the occurrence of motion in the first and second images when the counter exceeds a first threshold value.

DESCRIPTION OF THE SPECIFIC EMBODIMENTS

Figure 1:
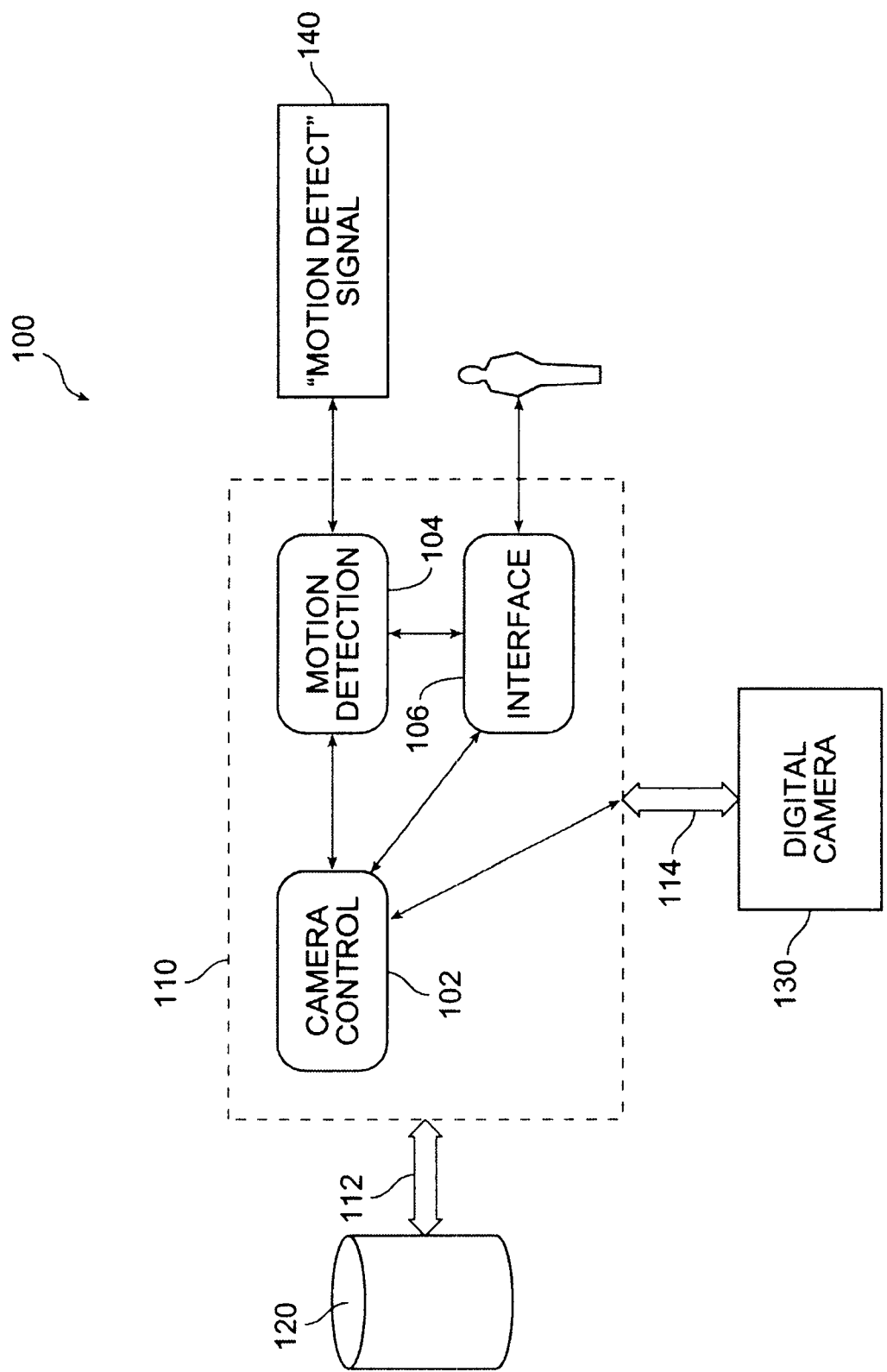
FIG. 1 is a simplified illustration of a computing system in accordance with the invention.

Referring to FIG. 1, a simplified representation of a system 100 according to the present invention includes a computing device 110. Typical devices include personal computers, but higher end systems such as workstations can be used as well. The computing device includes a central processing unit for executing program instructions. A random access memory (RAM) provides storage to hold the various programs such as the operating system and the application software comprising the present invention.

A mass storage device 120 is provided. The mass storage device can be a internal disk drive, in which case bus 112 is an internal data bus. Alternatively, mass storage device 120 can be a disk server accessed over a network, in which case bus 112 is a network connection such as an ethernet connection. These and numerous alternate configurations are known.

A digital camera 130 serves as a source of digital image data. Typically, the camera includes conventional optical components for focusing an image upon a charged-coupled device (CCD) array, thereby storing the image in the elements of the array. Electronics in the camera read out the array and produce the digital image data. The data is then sent over bus 114 to the computing device. In one embodiment of the invention, it is contemplated that digital camera 130 communicates directly with computing device 110 over a simple communication channel such as a serial link, providing the image data as a stream of data. It is also contemplated that digital camera 110 can include additional circuitry, logic, and software to communicate over a network. For example, bus 114 might be an ethernet link providing communication using TCP/IP, IPX, or some other public-domain or privately owned protocol. Bus 114 might even be a wireless link. The invention is not limited by the manner in which camera 130 communicates its data to computing device 110.

Various software resides in computing device 110. Typically, there is an operating system. More particularly related to the present invention are the software components shown in FIG. 1. Camera 130 is controlled in various ways by camera control software 102. In one embodiment of the invention, software 102 simply issues commands to the camera to digitize and transmit image data. The image data is typically stored in computing device as an array of pixels for further processing by software 102. For example, the image can be manipulated in various ways. The image can be scaled. Various image processing operations can be performed, such as dithering, smoothing, gamma correction, and so on. The image can be saved to disk, represented in FIG. 1 as storage device 120.

Where camera 130 is a more sophisticated device, control software 102 will have additional capability. For example, camera 130 may be capable of recording and optionally storing a video recording. The optics of camera 130 might be remotely controllable. It is understood that software 102 would include code to access these additional functions. Where the camera is accessible over the network, additional code would be needed to communicate over the network.

Camera control software 102 interacts with motion detection software 104. In accordance with the invention, the detection of motion in the digital images is acted on by camera control software 102. In one embodiment, software 102 will activate camera 130 to acquire an image. This enables the system to capture an image (a snapshot) of the scene in which the motion occurred. In another embodiment, camera 130 is capable of motion video imaging. In this case, control software 102 interacts with camera 130 to collect a series of images of the scene to record a video clip of the event. The camera can either collect a series of images before being uploaded to computing device 110 under the control of software 102, or each image of the video clip can be uploaded at the time the image is acquired. In yet another embodiment of the invention, the motion detection software 102 can trigger a motion detected signal 140. This signal can be used in any of a number of ways. Further details of software 104 will be discussed below.

Computing device 110 includes user interface software 106. Typically this is a graphical user interface (GUI) such as the windows-based environments provided by Apple Computer, Inc. and Microsoft Corp. The GUI provides access to control software 102 and motion detect software 104. Thus, a user can access camera 130 via software 102 to actuate the camera as desired. The GUI allows the user to set various parameters for taking a picture. As will be explained below, motion detect parameters for detection software 104 can be set; e.g. how much motion must occur before activating the camera.

It should be noted that the present invention does not require that interface software 106 be a GUI-type interface. Instead, the interface can be a command-line interface, where commands are typed in via keyboard to control camera 130 and to set motion detection parameters. Alternatively, interface software 106 can be a file of commands which are fed to the other software components by the operating system. These and other interface alternatives are contemplated for the invention and would work equally well. The particulars will depend on the specific computing environment and other such considerations.

The software components of FIG. 1 are shown for illustrative purposes to facilitate their description. The actual software may be provided as a single package or as many independently provided, but otherwise cooperative software packages. The software can be written in any of a number of languages and software platforms; e.g. code compiled for a specific machine, or a machine-independent platform such as the Java® language developed by Sun Microsystems. The particular arrangement of the program code comprising the software does not bear on the present invention. Rather, the packaging of the software will depend on the computing system being used, the particular operating environments, the level of sophistication of the intended users, and so on.

Figure 2:
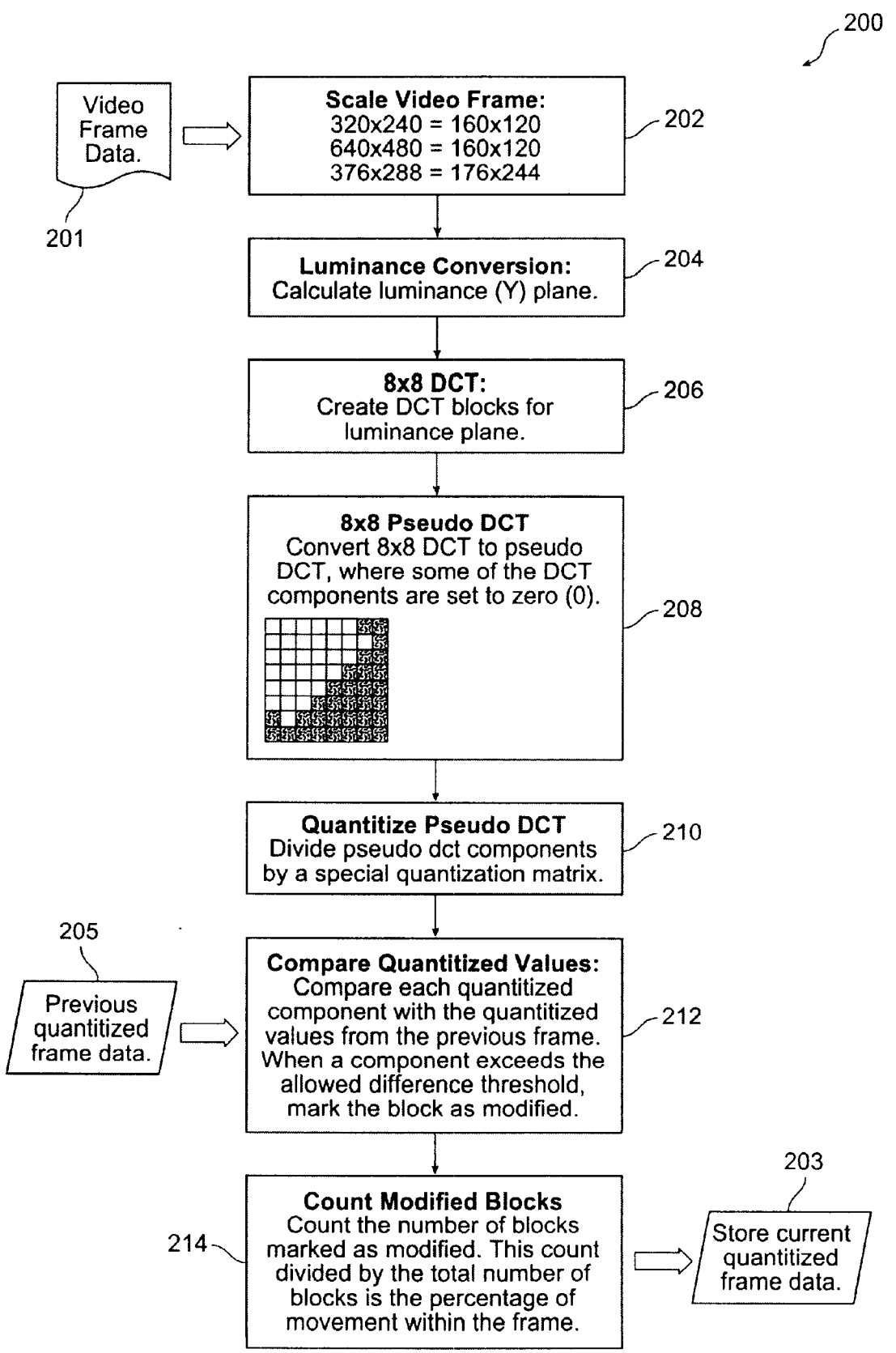
FIG. 2 is a flowchart illustrating the salient features of the invention.

Referring to FIG. 2, the motion detection module shown in FIG. 1 will now be described in connection with the flowchart 200. The flowchart illustrates the salient aspects of the invention and is intended as a vehicle for describing the invention. It is noted, and discussed below as needed, that actual implementation of these aspects of the invention may be combined in ways that are not illustrated in the flowchart. For example, some of the steps called out in the flowchart may be combined into a single operation. Conversely, some steps may need to be separated into separate software modules. Factors such as the particulars of the programming language being used and performance considerations will dictate the specific form and structure of the actual code that is produced.

Frames of video are captured in step 202 by camera 130 and fed into the motion detection process. The video frames are stored in the form of an array of pixels, having any of a variety of known resolutions and color schemes. For example, typical image resolutions include arrays of 160× 120, 320×240, 176×144, 352×288, and 640×480. In one embodiment of the invention, each frame is a 24-bit RGB image. Each pixel comprises three 8-bit values, one for each of the three RGB colors red, green and blue. In another format, the image may be a gray scale image, comprising 8-bit (256 gray levels) or 16-bit (65,536 gray levels) pixels. In still yet another format, 16-bit RBG555 images would be converted to 24-bit images. From the foregoing, it is clear that any of a number of color and grayscale formats are contemplated, and would well within the conventional level of skill of a practitioner in the digital image arts.

The captured frame is then scaled in step 202 to produce a smaller image. Preferably, the smallest image sizes are arrays of size 160×120 or 176×144 for the reason that these are conventional image sizes. Thus, a 352×288 image would be scaled down to 176×144. Similarly, an array of 320×240 would be scaled down to 160×120. A 640×480 image is scaled down to 160×120. Other sizes can be accommodated in accordance with the invention without departing from the scope and spirit of the invention.

Figure 3A:
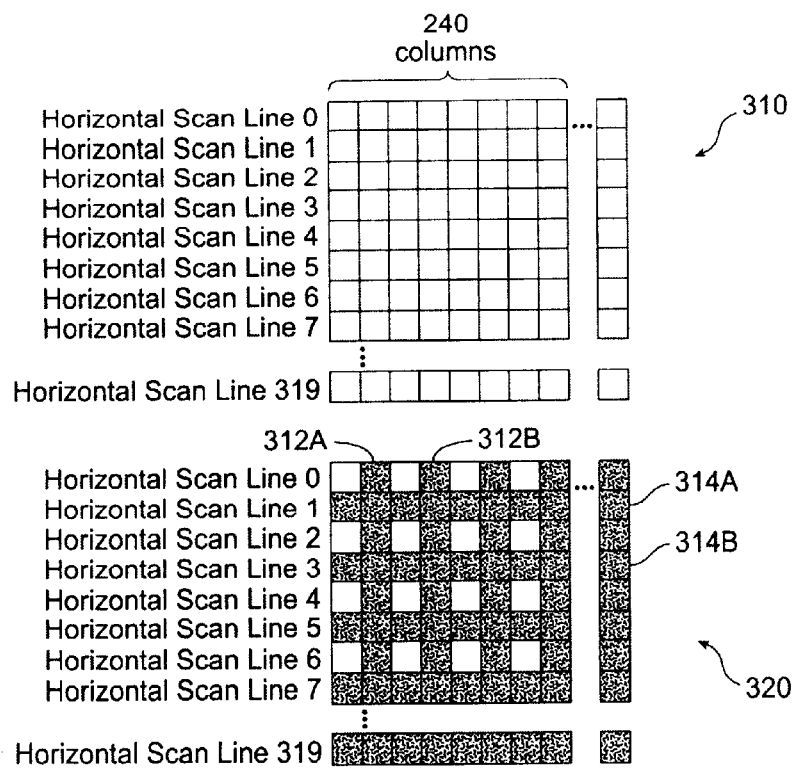
FIGS. 3A and 3B illustrate the reduction operation on certain video images.

The scaling operation involves removing alternating columns and rows from the original image to produce the scaled image. FIG. 3A shows how a 320×240 image is scaled down. The original image comprises 320 horizontal scan lines, each having 240 pixels. This is stored in the form of an array 310 that is 320 rows by 240 columns. If the image is a 24-bit color image, then each element in the array may be a structure comprising three 8-bit variables, or the image is contained in three separate 320×240 arrays. These and other data structures are known to those or ordinary skill in the computer programming arts.

The scaling occurs by eliminating every other row and every other column from the original image 310. Thus, the reduced image 312 is obtained by ignoring every other column 312A, 312B and so on, and by ignoring every other row 314A, 314B and so on. The result is the 160×120 image 312. Reduction of a 352×288 image is achieved in a similar manner to produce a 176×144 array.

Figure 3B:
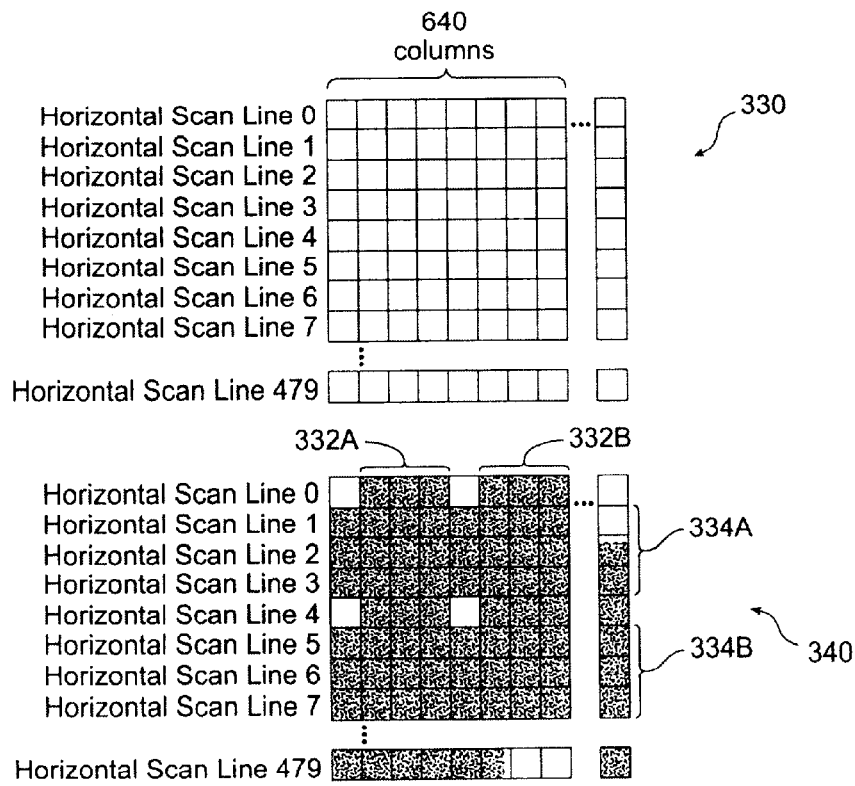

FIG. 3B illustrates a slightly modified operation for reducing a 640×480 image 330. Here, every fourth row and every fourth column is preserved. Thus, columns 332A, 332B and so on are ignored, as are rows 334A, 334B and so on. The result is the desired 160×120 image 340.

The effect of the reduction of the images can be appreciated from the grayed out areas in reduced image 320 in FIG. 3A and reduced image 340 in FIG. 3B. It can be seen that only a portion of the original image is preserved. As will become clear in the discussion below, this reduces the computational load on the subsequent processing for detecting motion. An important aspect of the reduction process is that pixels which are ignored be evenly distributed. Ignoring image pixels of course eliminates information contained in the video scene. It is believed that uniformly ignoring certain pixels as shown in FIGS. 3A and 3B serve to minimize this effect. Thus, an alternative to the scheme shown in FIG. 3B for 640×480 images, is image reduction by ignoring every other pair of columns and every other pair of rows to obtain the 160×120 image.

Continuing with FIG. 2, the next step, step 204, is to compute the luminance (Y) plane of the standard YCrCb color space conversion. The computation is:

$$Y=((0.257*(R))+(0.504*(G))+(0.098*(B))+16)$$

where Y is the Y-component of the luminance array,
R is the red array,
G is the green array, and
B is the blue array.

For the purposes of the invention, the Cr and Cb components are not computed. In a preferred embodiment, the following simplified integer-based form is used to compute the luminance (Y) plane:

$$Y=(R<<8+G<<9+B<<7)>>10+16.$$

This is a faster computation since it simply involves bit shifting. Recall that each color pixel is typically an 8-bit value. In order to provide higher precision, each color pixel is stored in a 24-bit datum. The pixels are then left shifted (multiplied) by amounts greater than their floating point counterparts. The subsequent 10-bit right shift compensates for these multiplication operations.

In the preferred embodiment of the invention, steps 202 and 204 are performed together. Thus, the code steps through the original array and produces the Y luminance array, simply ignoring some of the rows and columns of the original array per the discussion in connection with FIGS. 3A and 3B. This approach avoids having to make a first pass of the incoming image to produce the reduced size image, and then make another pass on the reduced image to produce the luminance plane. Rather, a single pass is sufficient.

Next, in step 206, the luminance plane is converted into 8×8-sized discrete cosine transform (DCT) data blocks using a standard DCT mathematical formula:

$$DCT_{(i,j)} = \frac{1}{\sqrt{2N}} C_i C_j \sum_{i=0}^{N-1} \sum_{y=0}^{N-1} pixel_{(x,y)} \times \cos\left(\frac{(2x+1)i\pi}{2N}\right) \times \cos\left(\frac{(2y+1)j\pi}{2N}\right),$$

where $C_x = 1/\sqrt{2}$
if x is 0, else 1 otherwise and
N is 8.

Recall that there are only two image sizes to consider: 160×120 and 176×144. Thus, for a 160×120 array, there will be 300 DCT blocks, and for a 176×144 array there will be 396 DCT blocks. Thus, by considering only a portion of the original image, the number of DCT blocks is reduced by a substantial amount. For example, a 352×288 original image would result in 1584 DCT blocks for subsequent analysis. A 640×480 image would produce 4800 DCT blocks for subsequent analysis.

Figure 4:
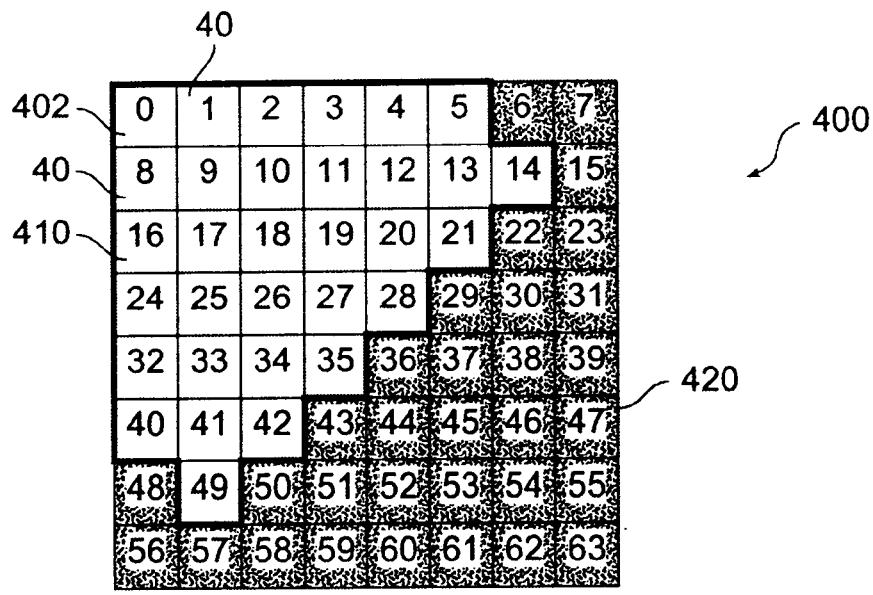
FIG. 4 shows the portion of the DCT blocks which are used per the invention.

In step 208, each of the DCT blocks created step 206 is converted into a pseudo DCT block. A pseudo DCT block 400 is shown in FIG. 4. There is a grayed-out portion 420 of the component values comprising a DCT block. These components, or elements, (e.g. elements 56–63) are ignored in the subsequent processing steps of the invention. The remaining portions of the DCT block, shown by region 410, comprise the "pseudo" DCT block. These remaining components make up the DCT values used further in the algorithm. Thus, for an array of N columns and N rows, the number of components of the pseudo block is less than $N^2$.

Figure 5:
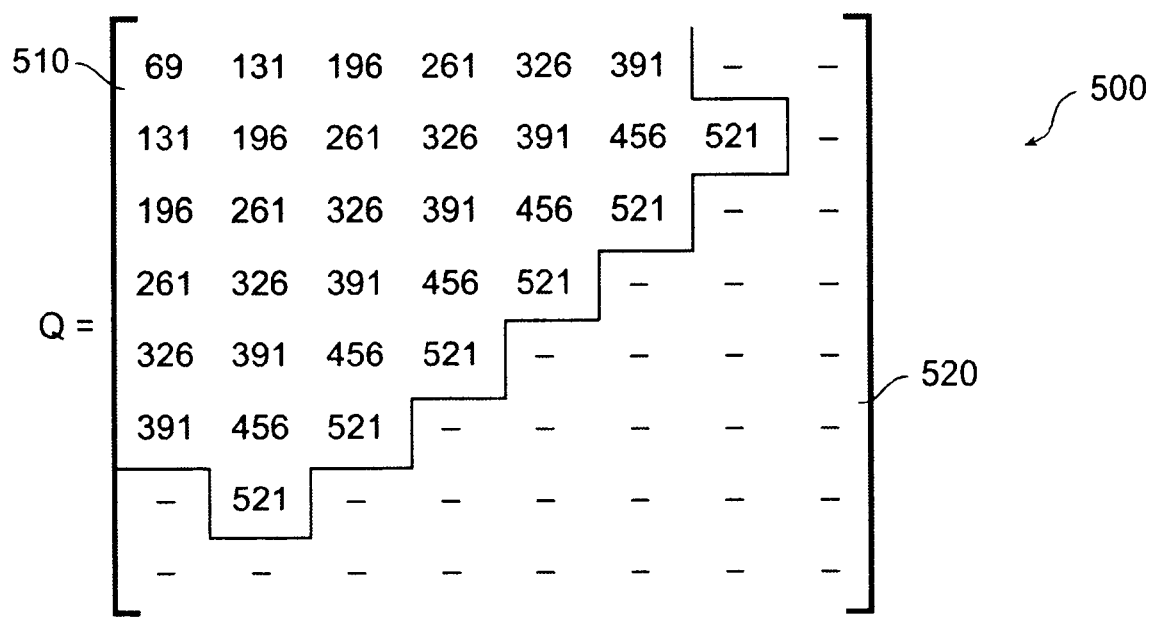
FIG. 5 shows a quantitization matrix in accordance with the invention.

In step 210, each pseudo DCT block in the video frame is quantitized to produce a current quantitized frame. Quantitizing the image involves dividing each DCT component by a number. FIG. 5 shows a quantization matrix 500 divided into correspondingly shaped regions 510 and 520 as shown in FIG. 4. For every element position in DCT block 400, there is a corresponding quantization number (value) in quantization matrix 500. This quantum value is the divisor of the corresponding DCT element. Quantization is simply the process of reducing the number of bits needed to store a number. Thus:

$$DCT\ quantitized\ value_{(i,j)} = \frac{DCT_{(i,j)}}{Q_{(i,j)}},$$

where Q is the quantitization matrix 500.

Using a quantization matrix with high values promotes loss of the original image information. The matrix of the present invent preserves high contrast values in the image, such as sharp lines, or large color differences in the original image. Image features with smooth color transitions will be lost. However, motion detection only requires the detection of actual changes in the image. A highly pixelated image would be smoothed out, allowing detection of sharp lines. Consider, for example, an 8×8 luminance block with one side of the block being solid white and the other side of the block being solid black. An associated DCT block at the transition between white and black would contain extremely high values. The quantization matrix 500 would reduce the elements of the DCT block, but would leave vital information, namely, that relating to the transition between white and black. This vital information indicates the presence of a sharp or extreme change in the image at this block. This is the information used to detect motion. Smooth changes in the image are ignored. An 8×8 DCT block with smooth changes or low variance, will have a DCT block exhibiting lower values. An 8×8 DCT block with harsh changes or a single harsh change will produce a DCT block which has some high component values. Each DCT block is greatly smoothed after quantitizing. Consequently, any values which remain in the quantitized DCT block indicates changes from a DCT in a previous frame and hence the occurrence of motion.

In a preferred embodiment, only those element in region 510 of the quantitization matrix 500 participate in the quantization step. Since the values in region 520 are ignored, the computational overhead is reduced.

In step 212, each pseudo DCT block of the current quantitized frame (referred to as a current DCT block) is compared against a corresponding pseudo DCT block of the previous quantitized frame (referred to as a previous DCT block). Each element in the current DCT block is compared with its correspondingly positioned element in the previous DCT block. It is by this series of comparisons, that the detection of motion is achieved. If the DCT comparison satisfies one of a number of criteria, then the pseudo block is identified as MODIFIED. If the number of pseudo blocks that are identified as MODIFIED exceeds a certain threshold value, then it is concluded that motion has occurred with respect to the previous video frame.

It was discovered that a quick determination is possible for accurate determination of whether a current DCT block is MODIFIED, by inspecting the first entry of each of the two DCT blocks being compared. A fragment of pseudo-code represents this first criterion:

DIFF=CURRENT_PSEUDO_BLOCK[0]-
   PREVIOUS_PSEUDO_BLOCK[0]
DIFF=ABSOLUTE_VALUE(DIFF)
IF (DIFF>30)
   THEN REPORT_BLOCK_CHANGED
ENDIF

The algorithm looks at the first pseudo DCT component at index 0 (the first component). This value indicates brightness of the block, a higher value indicates an overall brighter block, where as a lower or negative value indicates a darker block. To account for lighting changes such as shadows and light and dark changes in an image which occur frequently and usually are not indicative of motion, this value is allowed to vary greatly between frames. Typically, this component ranges from −84 to +84. In a preferred embodiment, a threshold value of 30 between successive frames for this component is used. If the threshold is exceeded, then the current DCT block is immediately identified as MODIFIED and no further analysis of the two DCT blocks is needed. Processing then proceeds with the next pair of DCT blocks from the current and previous images.

If the first criterion is not met, then the algorithm continues with a second criterion, which includes considering two other DCT components in a special way, namely, components at index 1 and index 8. These values indicate overall change from light to dark horizontally and vertically in the block. In the preferred embodiment, the algorithm allows a threshold of 5 between successive frames for these components. If either of these comparisons exceeds the threshold, then a counter CHANGE_COUNT is incremented. Processing then continues with the other components in the pair of DCT blocks. Thus, DIFF=CURRENT_PSEUDO_BLOCK[1]-
   PREVIOUS_PSEUDO_BLOCK[1]
DIFF=ABSOLUTE_VALUE(DIFF)
IF (DIFF>5)
   THEN CHANGE_COUNT=CHANGE_COUNT+1
ENDIF
DIFF CURRENT_PSEUDO_BLOCK[8]-
   PREVIOUS_PSEUDO_BLOCK[8]
DIFF=ABSOLUTE_VALUE(DIFF)
IF (DIFF>5)
   THEN CHANGE_COUNT=CHANGE_COUNT+1
ENDIF For the remaining components, the following threshold is used. Thus, DIFF=CURRENT_PSEUDO_BLOCK[n]-
   PREVIOUS_PSEUDO_BLOCK[n]
DIFF=ABSOLUTE_VALUE(DIFF)
IF (DIFF>3)
   THEN CHANGE_COUNT=CHANGE_COUNT+1
ENDIF If the counter CHANGE_COUNT exceeds three, the current DCT block is marked as MODIFIED. Processing then proceeds with the next pair of DCT blocks from the current and previous images.

In step 214, the number of DCT blocks identified as MODIFIED is then stored. In addition, the current quantitized frame is stored (step 203) as the previous quantitized frame for the next iteration.

The number of MODIFIED DCT blocks represents a degree of detected motion, ranging from 0% to 100% of movement. Returning to FIG. 1, the interface can provide a graphical tool such as a slider control or a dial control to allow the user to specify a threshold value, above which motion is deemed to have occurred between two frames. This threshold value can be presented to the user in a form other than percentages. The interface can internally map the user input to a percentage value which the other software can use.

What is claimed is:

1. A method for detecting motion in digitized images, comprising steps of:

providing first and second arrays of pixels, said arrays of pixels representing previous and current images respectively;

producing a plurality of previous discrete cosine transform (DCT) blocks based on only a portion of said first array of pixels, each comprising a plurality of values;

producing a plurality of current DCT blocks based on only a portion of said second array of pixels, each comprising a plurality of values; and for each of said current DCT blocks, selectively classifying said current DCT block as MODIFIED, based on a comparison of only some of said values of said current DCT block with corresponding values of one of said previous DCT blocks;

whereby motion in said previous and current images is determined based on the number of MODIFIED blocks.

2. The method of claim 1 wherein said step of producing said previous DCT blocks includes computing a luminance array by making luminance calculations on every other row and every other column of said first array of pixels.

3. The method of claim 1 wherein producing said previous DCT blocks includes computing a luminance array by making luminance calculations on only some of the rows and some of the columns of said first array of pixels.

4. The method of claim 3 further including quantizing each of said previous and current DCT blocks prior to said step of marking.

5. The method of claim 4 wherein for each DCT block, fewer than all of its values are quantized.

6. The method of claim 1 wherein said step of classifying includes computing a difference between a first value of said previous DCT block and a corresponding first value of said current DCT block, and if said difference exceeds a threshold value, then classifying said current DCT block as MODIFIED.

7. The method of claim 1 wherein said step of classifying includes computing differences between said values of said previous DCT block and corresponding values of said current DCT block, and if the number of said differences which exceed a first threshold exceeds a second threshold, then classifying said current DCT block as MODIFIED.

8. A method for detecting motion in image data, comprising steps of:
  (a) providing a first digitized image comprising an array of pixels;
  (b) producing a first set of discrete cosine transform (DCT) blocks, based on a portion of said array of pixels;
  (c) repeating steps (a) and (b) for a second digitized image to produce a second set of DCT blocks, each of said DCT blocks comprising an N×N array of DCT values;
  (d) quantizing said first and second sets of DCT blocks to produce respectively first and second sets of quantized blocks, including quantizing only a portion of each DCT block so that each block has fewer than $N^2$ quantized values;
  (e) comparing said quantized values in one of said first quantized blocks against corresponding quantized values in one of said second quantized blocks, wherein each comparison produces a first outcome or a second outcome;
  (f) classifying said second quantized block as MODIFIED if the number of first outcomes produced in step (e) exceeds a threshold value; and
  (g) repeating steps (e) and (f) for each of said first and second quantized blocks;
    whereby the occurrence of motion in said first and said second images is detected based on the ratio of the number of said second quantized blocks that are classified as MODIFIED to the total number of quantized blocks in said second set of quantized blocks.

9. The method of claim 8 wherein said step (b) includes computing a luminance array by making luminance calculations on only some of the rows and some of the columns of said array of pixels.

10. The method of claim 8 wherein said step (e) includes computing a difference between a first quantized value in said first quantized block and a corresponding quantized value of said second quantized block, and if said difference exceeds a threshold value, then classifying said second quantized block as MODIFIED.

11. The method of claim 8 wherein said step (e) includes (i) computing differences between some of said quantized values in said first and second quantized blocks, the number of differences that exceed a first threshold value being equal to x, and (ii) computing differences between others of said quantized values in said first and second quantized blocks, the number of differences that exceed a second threshold value being equal to y; and wherein in said step (f) if the sum of x and y exceeds a third threshold value then classifying said second quantized block as MODIFIED.

12. A motion detection system comprising:

a computing device; and a source of digital image data coupled to said computing device, said image data corresponding to images of a scene in which motion is to be detected;

said computing device having a memory to store at least on of said images in the form of an array of pixels;

said computing device including a computer program comprising:
    first program code to produce an array of luminance data based on only a portion of said array of pixels;
    second program code to produce a set of discrete cosine transform (DCT) data blocks based on said luminance data, whereby a first set of DCT data blocks is produced for a first image and a second set of DCT data blocks is produced for a second image;
    third program code to compare corresponding data between two of said DCT blocks, wherein only some of said data between said two DCT blocks is compared, said third program code including a counter that is incremented when comparison of said two DCT blocks satisfies a first criterion;
    fourth program code to execute said third program code for pairs of DCT data blocks taken from said first and said second sets of DCT data blocks; and
    fifth program code to indicate the occurrence of motion in said first and second images when said counter exceeds a first threshold value.

13. The system of claim 12 wherein said third program code includes:

first additional code to compute a difference between a datum in one of said two DCT data blocks and a corresponding datum in the other of said two DCT data blocks;

second additional code to execute said first additional code for other data of said two DCT data blocks, thereby producing a plurality of difference values, the number of said difference values that exceed a second threshold value being equal to x;

wherein said first criterion is satisfied when x is greater than a third threshold value.

14. The system of claim 12 further including sixth program code for quantizing only a portion of each of said first and said second sets of DCT data blocks.

15. The system of claim 12 wherein said third program code includes code to increment said counter when a first datum of one of said two DCT data blocks and a corresponding first datum of the other of said two DCT data blocks satisfy a second criterion.

16. The system of claim 15 wherein said second criterion is that a difference between both of said first data exceeds a second threshold value.

17. The system of claim 12 further including an image acquisition device for generating digital image data of a scene; said fifth program code including code to operate said image acquisition device to generate digital image data in response to said counter exceeding said first threshold value.

18. The system of claim 17 wherein said digital image data comprises a single image.

19. The system of claim 17 wherein said digital image data comprises a plurality of successive images.

20. A computer program product for detecting motion in image data, said image data stored in a memory of a computer in the form of arrays of pixels, said computer program product comprising:

first program code to produce an array of luminance data based on only a portion of said array of pixels;

second program code to produce a set of discrete cosine transform (DCT) data blocks based on said luminance data, whereby a first set of DCT data blocks is produced for a first image and a second set of DCT data blocks is produced for a second image;

third program code to compare corresponding data between two of said DCT blocks, wherein only some of said data between said two DCT blocks is compared, said third program code including a counter that is incremented when comparison of said two DCT blocks satisfies a first criterion;

fourth program code to execute said third program code for pairs of DCT data blocks taken from said first and said second sets of DCT data blocks; and fifth program code to indicate the occurrence of motion in said first and second images when said counter exceeds a first threshold value.

21. The computer program product of claim 20 wherein said third program code includes:

first additional code to compute a difference between a datum in one of said two DCT data blocks and a corresponding datum in the other of said two DCT data blocks;

second additional code to execute said first additional code for other data of said two DCT data blocks, thereby producing a plurality of difference values, the number of said difference values that exceed a second threshold value being equal to x;

wherein said first criterion is satisfied when x is greater than a third threshold value.

22. The computer program product of claim 20 further including sixth program code for quantizing only a portion of each of said first and said second sets of DCT data blocks.

23. The computer program product of claim 20 wherein said third program code includes code to increment said counter when a first datum of one of said two DCT data blocks and a corresponding first datum of the other of said two DCT data blocks satisfy a second criterion.

24. The computer program product of claim 23 wherein said second criterion is that a difference between both of said first data exceeds a second threshold value.

25. The computer program product of claim 20 further including an image acquisition device for generating digital image data of a scene; said fifth program code including code to operate said image acquisition device to generate digital image data in response to said counter exceeding said first threshold value.

26. The computer program product of claim 25 wherein said digital image data comprises a single image.

27. The computer program product of claim 25 wherein said digital image data comprises a plurality of successive images.

* * * * *